United States Patent
Benson (10) Patent No.: US 9,188,657 B2
(45) Date of Patent: Nov. 17, 2015

(54) SYSTEMS AND METHODS OF TRANSMITTER LOCATION DETECTION

(71) Applicant: The Boeing Company, Chicago, IL (US)

(72) Inventor: Christopher P. Benson, Berkeley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/162,965

(22) Filed: Jan. 24, 2014

(65) Prior Publication Data

US 2015/0153436 A1    Jun. 4, 2015

Related U.S. Application Data

(60) Provisional application No. 61/911,202, filed on Dec. 3, 2013.

(51) Int. Cl.
*G01S 1/02* (2010.01)
*B64C 19/00* (2006.01)
(Continued)

(52) U.S. Cl.
CPC . *G01S 1/02* (2013.01); *B64C 19/00* (2013.01); *G01S 5/02* (2013.01); *G01S 5/0221* (2013.01); *G01S 5/06* (2013.01)

(58) Field of Classification Search
CPC ..... G08G 5/0069; G08G 5/00; G08G 5/0021; G06Q 10/087; G05D 1/101; G05D 1/0202; F41H 11/02; F42B 12/70; H01Q 1/246; H01Q 21/065; G01D 4/004; G01D 4/006; G01S 1/02; F41G 7/346; B64C 39/024

USPC ........ 701/3, 4, 25; 705/28; 89/1.11; 370/352; 340/870.02; 244/3.1, 48; 342/33
See application file for complete search history.

(56) References Cited

U.S. PATENT DOCUMENTS 4,042,929 A    8/1977 Dorey
H628 H *    4/1989 McIngvale ...................... 342/33
(Continued)

FOREIGN PATENT DOCUMENTS

DE    19512787 A1    9/1996
FR    2624981 A1    6/1989
FR    2971340 A1    8/2012

OTHER PUBLICATIONS

International Search Report and Written Opinion, International Application No. PCT/US2014/057289; mailed Jan. 20, 2015; 10 pages.

*Primary Examiner* — Tuan C. To
*Assistant Examiner* — Yuri Kan
(74) *Attorney, Agent, or Firm* — Toler Law Group, PC (57) ABSTRACT

A method includes controlling a plurality of rotors to cause a plurality of antennas to traverse a flight path. Traversing the flight path includes concurrent translation of a body in a horizontal plane and rotation of the body about an axis. The plurality of rotors is coupled to the body. The method also includes, while traversing the flight path, receiving a first phase measurement of a first signal via a first antenna of a plurality of antennas and receiving a second phase measurement of the first signal via a second antenna of the plurality of antennas. The method further includes determining position information related to a location of the transmitter based at least in part on the first phase measurement and the second phase measurement.

20 Claims, 4 Drawing Sheets

(51) Int. Cl.
*G01S 5/02* (2010.01)
*G01S 5/06* (2006.01)

(56) References Cited

U.S. PATENT DOCUMENTS

| | | | |
|---|---|---|---|
| 7,570,212 | B2 | 8/2009 | Lommen et al. |
| 8,044,859 | B2 | 10/2011 | Lommen et al. |
| 8,390,514 | B1 | 3/2013 | Baker et al. |
| 8,406,280 | B2 | 3/2013 | Draganov et al. |
| 2001/0038342 | A1* | 11/2001 | Foote ............... 340/870.02 |
| 2004/0196834 | A1* | 10/2004 | Ofek et al. ............ 370/352 |
| 2008/0035785 | A1* | 2/2008 | Grabmeier ............. 244/3.1 |
| 2008/0133069 | A1* | 6/2008 | Morales De La Rica et al. ................ 701/4 |
| 2008/0190274 | A1* | 8/2008 | Kirkpatrick ............ 89/1.11 |
| 2011/0062278 | A1* | 3/2011 | Ulrich et al. ............ 244/48 |
| 2014/0032034 | A1* | 1/2014 | Raptopoulos et al. ...... 701/25 |
| 2014/0277854 | A1* | 9/2014 | Jones et al. .............. 701/3 |
| 2014/0344118 | A1* | 11/2014 | Parpia et al. ............ 705/28 |

\* cited by examiner

SYSTEMS AND METHODS OF TRANSMITTER LOCATION DETECTION

FIELD OF THE DISCLOSURE

The present disclosure is generally related to systems and methods of transmitter location detection.

BACKGROUND

Determining a geospatial location of a transmitter (e.g., a cell phone) may have application in civilian search and rescue, law enforcement, and military environments. Phase measurements of signals emitted by the transmitter and received by two or more antennas may be used to determine estimated locations of the transmitter. For example, the antennas at fixed locations may receive the signals and an estimate of the location of the transmitter may be determined based on phase measurements of the signals. The phase measurements of the signals received at fixed spatial points may not enable estimation of the location of the transmitter with a high degree of accuracy.

SUMMARY

Systems and methods of transmitter location detection are disclosed. The disclosed embodiments enable several phase measurements of signals received by antennas at different spatial points. The antennas may be coupled to a device (e.g., an unmanned aerial vehicle). The device may follow a flight path that includes concurrent translation of a body of the device in a horizontal plane (e.g., forward, backward, diagonal, or side-to-side motion) and rotation of the body about an axis. While traversing the flight path, the antennas may receive signals from the transmitter at different spatial points resulting in multiple phase measurements. A signal processor may determine position information related to the transmitter based on the phase measurements.

In a particular embodiment, a method includes controlling a plurality of rotors to cause a plurality of antennas to traverse a flight path. Traversing the flight path includes concurrent translation of a body in a horizontal plane and rotation of the body about an axis. The plurality of rotors is coupled to the body. The method also includes, while traversing the flight path, receiving a first phase measurement of a first signal via a first antenna of the plurality of antennas and receiving a second phase measurement of the first signal via a second antenna of the plurality of antennas. The method further includes determining position information related to a location of the transmitter based at least in part on the first phase measurement and the second phase measurement.

In another particular embodiment, a device includes a body, a plurality of rotors coupled to the body, a plurality of antennas physically coupled to the body, a controller coupled to the body, and a signal processor coupled to the body. The plurality of antennas are configured to receive a first signal from a transmitter. The controller is configured to control the plurality of rotors to cause the plurality of antennas to traverse a flight path. Traversing the flight path includes concurrent translation of the body in a horizontal plane and rotation of the body about an axis. The signal processor is configured to determine a first phase measurement of the first signal received at a first antenna of the plurality of antennas and to determine a second phase measurement of the first signal received at a second antenna of the plurality of antennas. The signal processor is also configured to determine position information related to a location of the transmitter based at least in part on the first phase measurement and the second phase measurement.

In another particular embodiment, a computer-readable storage device stores instructions that, when executed by a processor, cause the processor to perform operations. The operations include controlling a plurality of rotors to cause a plurality of antennas to traverse a flight path. Traversing the flight path includes concurrent translation of a body in a horizontal plane and rotation of the body about an axis. The plurality of rotors is coupled to the body. The operations also include, while traversing the flight path, receiving a first phase measurement of a first signal via a first antenna of the plurality of antennas and receiving a second phase measurement of the first signal via a second antenna of the plurality of antennas. The plurality of antennas is configured to receive the first signal from a transmitter. The operations further include determining position information related to a location of the transmitter based at least in part on the first phase measurement and the second phase measurement.

Thus, particular embodiments facilitate transmitter location detection. The signal processor may estimate the location of the transmitter with greater precision or more quickly using phase measurements corresponding to signals received at multiple antennas at various spatial points as compared to phase measurements corresponding to signals received at antennas located at fixed spatial points. The concurrent translation and rotation of the body of the device may enable the device to follow a flight path that results in a more accurate and/or a more efficient estimation of the transmitter location.

The features, functions, and advantages that have been described can be achieved independently in various embodiments or may be combined in other embodiments, further details of which are disclosed with reference to the following description and drawings.

DETAILED DESCRIPTION

Figure 1:
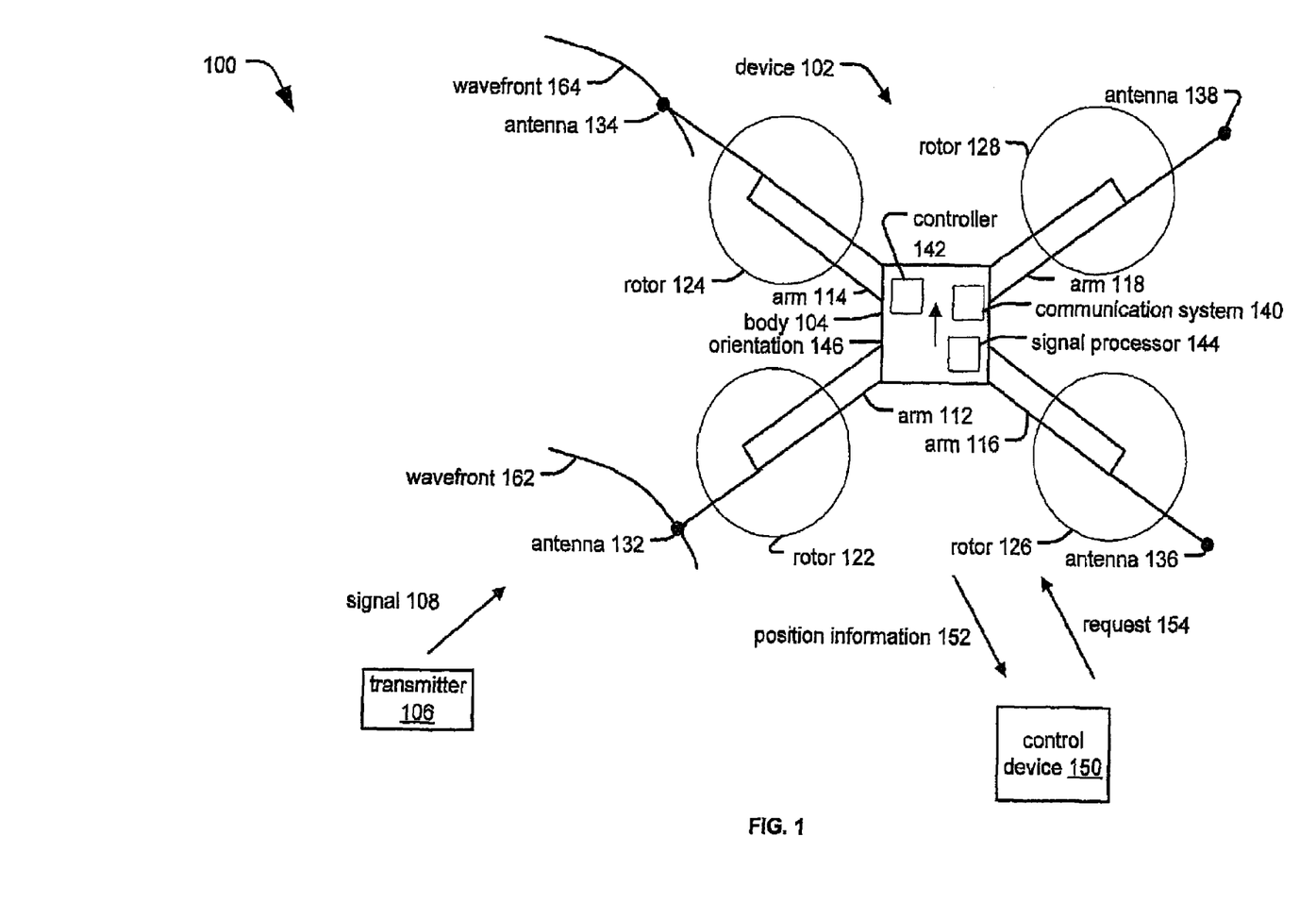
FIG. 1 is a diagram of a particular embodiment of a system to detect a transmitter location.

Referring to FIG. 1, a diagram of a particular embodiment of a system to detect a transmitter location is disclosed and generally designated 100. The system 100 may include a transmitter 106 and a device 102 (e.g., an unmanned aerial vehicle (UAV)). In a particular embodiment, the device 102 is in communication with a control device 150 (e.g., a ground control device). In a particular embodiment, the device 102 may have intermittent communication with the control device 150. In an alternative embodiment, the device 102 may not be in direct communication with a ground control device (e.g., the control device 150). In this embodiment, the device 102 may operate (e.g., fly, navigate, or both) autonomously. For example, the device 102 may operate using an auto-pilot to traverse a flight path to pre-programmed or self-chosen points.

The device 102 may include a body 104 coupled to a controller 142 and to a signal processor 144. The device 102 may also include a plurality of rotors (e.g., rotors 122, 124, 126, and 128) coupled to the body 104. In a particular embodiment, a plurality of arms (e.g., arms 112, 114, 116, and 118) extends away from a central portion of the body 104. The arm 112 (or arm 114) may extend in a first direction from the central portion. The arm 118 (or arm 116) may extend from the central portion in a second direction opposite to the first direction in a horizontal plane. A rotor of the plurality of rotors (e.g., rotors 122, 124, 126, and 128) may be coupled to an arm of the plurality of arms (e.g., the arms 112, 114, 116, and 118). For example, the rotor 122 may be coupled to the arm 112, the rotor 124 may be coupled to the arm 114, the rotor 126 may be coupled to the arm 116, the rotor 128 may be coupled to the arm 118, or a combination thereof. Although the device 102 is shown as a quadcopter in FIG. 1, it should be understood that the device 102 may have a different configuration. For example, the device 102 may have fewer or more than four rotors, fewer or more than four arms, a different arrangement of the plurality of rotors, a different arrangement of the plurality of arms, or a combination thereof.

The device 102 may include a plurality of antennas (e.g., antennas 132, 134, 136, and 138) physically coupled to the body 104. In a particular embodiment, an antenna of the plurality of antennas (e.g., the antennas 132, 134, 136, and 138) may be coupled to an arm of the plurality of arms (e.g., the arms 112, 114, 116, and 118). For example, the antenna 132 may be coupled to the arm 112, the antenna 134 may be coupled to the arm 114, the antenna 136 may be coupled to the arm 116, the antenna 138 may be coupled to the arm 118, or a combination thereof. In a particular embodiment, the plurality of antennas (e.g., the antennas 132, 134, 136, and 138) may include a telescoping antenna. For example, the antenna 132 may be stored in the arm 112. The antenna 132 may extend out from the arm 112 in response to being activated by the signal processor 144. In a particular embodiment, the plurality of antennas (e.g., the antennas 132, 134, 136, and 138) may include an antenna fixed at a particular location. For example, the antenna 134 may be fixed near an end of the arm 114, in a housing, or at the rotor 124.

In a particular embodiment, the plurality of antennas (e.g., antennas 132, 134, 136, and 138) may be separated by a distance greater than several wavelengths of a signal to be measured. For example, when the transmitter 106 (e.g., a cell phone) transmits signals at a particular frequency (e.g., 390 megahertz (MHz)) having a corresponding wavelength (e.g., 0.76 meters), the antennas 132, 134, 136, and 138 may be separated by a distance greater than the wavelength (e.g., 0.76 meters). In a particular embodiment, the antennas 132, 134, 136, and 138 may be separated by a distance (e.g., approximately 3 meters) corresponding to a multiple (e.g., approximately 4 times) of the wavelength (e.g., 0.76 meters). Each of the plurality of antennas (e.g., the antennas 132, 134, 136, and 138) may include a monopole antenna, a dipole antenna, an antenna array, another type of antenna, or a combination thereof.

The device 102 may include a communications system 140. The communication system 140 may be configured to communicate with the control device 150. For example, the control device 150 may send a message to control operation of the device 102. As another example, the device 102 may send a message to provide position information related to a location of the transmitter 106.

The system 100 may include fewer or more components than illustrated in FIG. 1. For example, the system 100 may include more than one device 102. The control device 150 may refine estimation of the location of the transmitter 106 based on position information (e.g., position information 152) received from multiple unmanned aerial vehicles 102. The system 100 may include a networked or distributed computing system.

During operation, the controller 142 may control the plurality of rotors (e.g., the rotors 122, 124, 126, and 128) to cause the plurality of antennas (e.g., the antennas 132, 134, 136, and 138) to traverse a flight path. Traversing the flight path may include concurrent translation of the body 104 in the horizontal plane and rotation of the body 104 about an axis. An illustrative flight path is described with reference to FIG. 2. In a particular embodiment, the flight path may include a predetermined turn, a predetermined rotation, or both. In a particular embodiment, the controller 142 may receive data indicating the flight path from the control device 150. In an alternative embodiment, the controller 142 may determine the flight path based on estimated position information of the transmitter 106. For example, the estimated position information may include an address, coordinates, and/or an area (e.g., 10 miles by 10 miles around the location of the device 102) to be searched. To illustrate, the estimated position information may indicate that an area (e.g., 2 miles by 2 miles) surrounding a particular address (e.g., 123 Berry Street, Austin, Tex.) is to be searched to detect the transmitter 106.

The controller 142 may determine a path from a location of the device 102 to a location indicated by the estimated position information of the transmitter 106. For example, the estimated position information may indicate multiple possible locations (e.g., an area, such as a particular city, or multiple addresses). The controller 142 may determine the flight path (e.g., zig-zag over Austin, Tex.) to cover the multiple possible locations. The flight path may include turns, rotations, or both. For example, the controller 142 may sort the multiple possible locations by proximity from the device 102. The controller 142 may select a first location that is closest to the device 102 as a next location of the flight path. The controller 142 may continue building the flight path by repeating the process of sorting the remaining possible locations based on proximity from a previously selected location (e.g., the first location), selecting a location closest to the previously selected location to add to the flight path, and removing the selected location from further consideration in building the flight path, until all of the multiple possible locations are added to the flight path.

In a particular embodiment, the controller 142 may determine the flight path to converge on a single estimated location (e.g., by eliminating other possible locations). For example, the controller 142 may dynamically determine the flight path. To illustrate, the estimated position information may indicate multiple possible locations. The controller 142 may add a first location that is closest to the device 102 to the flight path. The controller 142 may cause the device 102 to traverse the flight path to the first location. At the first location, the controller 142 may remove one or more of the possible locations from consideration based on whether signals are detected from the transmitter 106. For example, if no signals are detected from the transmitter 106 at the first location, the controller 142 may modify the estimated position information to remove possible locations within a particular radius (e.g., corresponding to a detection range of the antennas 132, 134, 136, and 138) of the first location. As another example, if a signal is detected from the transmitter 106 at the first location, the signal processor 144 may determine position information based on the signal, as further described below. The controller 142 may modify the estimated position information to remove possible locations not indicated by the position information. The estimated position information may converge to a single possible location as the other possible locations are removed from consideration.

In a particular embodiment, the controller 142 may determine the location of the device 102 using a positioning system (e.g., a global positioning system (GPS), an inertial navigation system (INS), and/or a local positioning system). In a particular embodiment, the controller 142 may receive the estimated position information of the transmitter 106 from the control device 150. In a particular embodiment, the controller 142 may receive the estimated position information of the transmitter 106 via a user interface, e.g., prior to the device 102 being airborne. For example, a user may be looking for a person carrying the transmitter 106 within a particular area (e.g., a neighborhood, a park, etc.). The user may send, via the user interface (or the control device 150), the estimated position information (e.g., an address, coordinates, and/or area) corresponding to the particular area. In response to receiving the estimated position information, the controller 142 may cause the device 102 to traverse a flight path configured to search the particular area.

In a particular embodiment, the signal processor 144 may activate the antennas 132, 134, 136, and 138. For example, the signal processor 144 may activate the antennas 132, 134, 136, and 138 in response to the device 102 reaching a location indicated by the estimated position information, in response to the device 102 reaching a threshold altitude, or both. In a particular embodiment, the device 102 may receive data indicating the threshold altitude from the control device 150 or via the user interface. In a particular embodiment, the threshold altitude may be determined based on user preference. For example, a user may provide the threshold altitude via the user interface or the control device 150.

While traversing the flight path, the antennas 132, 134, 136, and 138 may receive signals from the transmitter 106. Phase measurements of the signals received by the antennas 132, 134, 136, and 138 may be determined by the signal processor 144. For example, the antennas 132 and 134 may receive a first signal from the transmitter 106. To illustrate, the antenna 132 may receive a wavefront of the first signal at a first time of arrival (e.g., a wavefront 162) and the antenna 134 may receive the same wavefront at a second time of arrival (e.g., a wavefront 164). The first time of arrival may be earlier than the second time of arrival when the transmitter 106 is closer to the antenna 132 than to the antenna 134. There may be a phase difference between the wavefront 162 and the wavefront 164 because of the greater distance traveled by the wavefront 164 to the antenna 134 than by the wavefront 162 to the antenna 132.

The signal processor 144 may determine a first phase measurement of the first signal received by the antenna 132 and may determine a second phase measurement of the first signal received by the antenna 134. For example, the signal processor 144 may determine the first phase measurement of the wavefront 162 and the second phase measurement of the wavefront 164. Each of the phase measurements may be used to determine an angle of arrival of a signal at an antenna of the plurality of antennas, a time of arrival of the signal at the antenna, or both. For example, the first phase measurement may correspond to an angle of arrival of the first signal at the antenna 132, a time of arrival of the first signal at the antenna 132, or both. As another example, the second phase measurement may correspond to an angle of arrival of the first signal at the antenna 134, a time of arrival of the first signal at the antenna 134, or both. The signal processor 144 may compare the first phase measurement and the second phase measurement to determine a phase difference and may determine an angle of arrival of the wavefront (e.g., the wavefronts 162 and 164) at the device 102 based on the phase difference. The angle of arrival of the wavefront (e.g., the wavefronts 162 and 164) at the device 102 may be a function of the phase difference and a distance between the antennas 132 and 134.

The signal processor 144 may determine position information (e.g., the position information 152) related to the transmitter 106 based at least in part on the phase measurements (e.g., the first phase measurement and the second phase measurement). The position information 152 may indicate one or more locations corresponding to possible locations of the transmitter 106 when the first signal is received. For example, the signal processor 144 may determine possible locations of the transmitter 106 that correspond to the angle of arrival of the wavefront (e.g., the wavefronts 162 and 164) at the device 102. To illustrate, the signal processor 144 may determine, based on the angle of arrival, that the possible locations of the transmitter 106 are indicated by a set of parallel lines on a three-dimensional grid map. For example, the set of parallel lines may be parallel to the angle of arrival of the wavefront (e.g., the wavefronts 162 and 164).

In a particular embodiment, the signal processor 144 may determine the position information 152 based at least in part on an orientation 146 of the body 104 at a time associated with each of the phase measurements (e.g., the first phase measurement and the second phase measurement). For example, the signal processor 144 may determine a location of the antenna 132 based on the orientation 146 and a location of the device 102 associated with the first phase measurement (e.g., at the time of receiving the first signal at the antenna 132). To illustrate, the antenna 132 may be located at a first distance and a first angle (e.g., 1.5 meters South and 1.5 meters West) relative to the orientation 146 of a center of the device 102 and the antenna 134 may be located at a second distance and a second angle (e.g., 1.5 meters North and 1.5 meters West) relative to the orientation 146 the center of the device 102. At the time of receiving the first signal at the antenna 132, the center of the device 102 may be at a first location and the orientation 146 of the device 102 may correspond to a first direction (e.g., North). The signal processor 144 may determine that the location of the antenna 132 at the time of receiving the first signal is at the first distance and the first angle (e.g., 1.5 meters South and 1.5 meters West) of the first location.

As another example, the signal processor 144 may determine the location of the antenna 134 based on the orientation 146 and the location of the device 102 associated with the second phase measurement (e.g., at the time of receiving the first signal at the antenna 134). To illustrate, the center of the device 102 may be at the first location and the orientation 146 of the device 102 may correspond to the first direction at the time of receiving the first signal at the antenna 134. The signal processor 144 may determine that the location of the antenna 134 at the time of receiving the first signal is at the second distance and at the second angle (e.g., 1.5 meters North and 1.5 meters West) of the first location.

The signal processor 144 may iteratively increase accuracy of the position information 152 as the plurality of antennas (e.g., the antennas 132, 134, 136, and 138) traverse the flight path based at least in part on additional phase measurements at different spatial locations. For example, the plurality of antennas (e.g., the antennas 132, 134, 136, and 138) may receive a second signal while traversing the flight path and additional phase measurements of the second signal may be determined. In a particular embodiment, the transmitter 106 may substantially continuously emit a signal. In an alternative embodiment, the transmitter 106 may intermittently emit a signal.

The additional phase measurements may be distinct from the first phase measurement and the second phase measurement based at least in part on the location of the plurality of antennas (e.g., the antennas 132, 134, 136, and 138) relative to the transmitter 106 at the time of receiving the second signal. For example, at the time of receiving the second signal at the antenna 132, the center of the device 102 may be at a second location and the orientation 146 of the device 102 may correspond to a second direction (e.g., West). The signal processor 144 may determine that the antenna 132 at the time of receiving the second signal is at a third distance and a third angle (e.g., 1.5 meters South and 1.5 meters East) of the second location. The third distance and the third angle may be determined based on the first distance, the first angle, and the orientation 146 (e.g., 1.5 meters South and 1.5 meters West of West is 1.5 meters South and 1.5 meters East). As another example, the signal processor 144 may determine that the location of the antenna 134 at the time of receiving the second signal is at a fourth distance and at a fourth angle (e.g., 1.5 meters South and 1.5 meters West) of the second location.

Based on the additional phase measurements, the signal processor 144 may update the position information 152 to remove some locations from the possible locations of the transmitter 106. For example, the signal processor 144 may apply a cross ambiguity function (CAF) to the first phase measurement, the second phase measurement, the additional phase measurements, or a combination thereof, to generate the possible locations indicated by the position information 152. To illustrate, the signal processor 144 may determine, based on the additional phase measurements, that the possible locations of the transmitter 106 are indicated by a second set of parallel lines on the three-dimensional grid map. The signal processor 144 may apply the cross ambiguity function to determine the possible locations of the transmitter 106 corresponding to the intersection of the first set of parallel lines and the second set of parallel lines. Fewer possible locations may correspond to the intersection of the first set of parallel lines and the second set of parallel lines than the possible locations indicated by the first set of parallel lines.

The controller 142 may modify the flight path based on a subset of the additional phase measurements. For example, the signal processor 144 or the controller 142 may determine modifications to the flight path based on the position information 152. To illustrate, the signal processor 144 may select a target location to add to the flight path that may increase the precision of the position information 152. In a particular embodiment, the signal processor 144 may select the target location to be approximately in a center of the possible locations indicated by the position information 152. For example, the signal processor 144 may use a traveling salesman optimization process to select a next target location based on the estimated position information and information determined about the possible locations of the transmitter 106. In a particular embodiment, the signal processor 144 may determine the next target location based on signal intensity. For example, the device 102 may be at a first location when receiving a first signal from the transmitter 106. The device 102 may be at a second location when receiving a second signal from the transmitter 106. The signal processor 144 may determine that a first intensity of the first signal is higher than a second intensity of the second signal. In response to the determination, the signal processor 144 may select the target location to be closer to the first location than the second location. The signal processor 144 may provide a feedback signal to the controller 142 indicating the target location. The controller 142 may modify the flight path in response to the feedback signal. For example, the controller 142 may add the target location as a next location in the flight path.

In a particular embodiment, the communication system 140 may transmit the position information 152 to the control device 150 and may receive a request 154 responsive to the position information 152 from the control device 150. For example, the control device 150 may determine the target location of the device 102 based on the position information 152 and may send the request 154 to the communication system 140. The request 154 may indicate the target location. The controller 142 may modify the flight path in response to receiving the request 154. For example, the controller 142 may add the target location as a next location in the flight path. Modifying the flight path may include causing rotation of the body 104, causing translation of the body 104, or both In a particular embodiment, the controller 142 may determine a path (e.g., a shortest path within particular operating constraints) from a location of the device 102 to the target location. The controller 142 may cause the device 102 to traverse the flight path to the target location. The phase measurements at the target location may correspond to a third set of parallel lines that intersects with the first set of parallel lines and the second set of parallel lines to reduce the number of possible locations.

The signal processor 144 may determine that the position information 152 satisfies a termination criterion and stop the location detection of the transmitter 106. For example, the termination criterion may be satisfied when the number of possible locations indicated by the position information 152 is less than or equal to a threshold number of possible locations (e.g., 1). As a further example, the termination criterion may be satisfied when a three-dimensional area indicated by the position information 152 is smaller than or equal to a threshold three-dimensional area (e.g., 2 feet×2 feet×2 feet). As an additional example, the termination criterion may be satisfied when a termination request is received from the control device 150. As another example, the termination criterion may be satisfied when a particular timer (e.g., 30 minutes) expires. For example, the device 102 may be used in regularly scheduled (e.g., daily) surveillance. The device 102 may be used to fly over a particular area and locate the transmitter 106 before the particular timer expires.

In a particular embodiment, the signal processor 144 may receive data identifying or setting the termination criterion from the control device 150. In an alternative embodiment, the signal processor 144 may receive the data identifying or setting the termination criterion via a user interface prior to the device 102 being airborne. After the location detection is stopped, the communication system 140 may send the position information 152 to the control device 150. The control device 150 may provide the position information 152 to a user (e.g., law enforcement officers, civilian search and rescue teams, military personnel, etc.) and/or may store the position information 152 in a database. Operation of the system 100 is further described with reference to FIGS. 2-3.

The system 100 may enable location detection of a transmitter. Phase measurements of a signal from the transmitter may be determined based on detection of the signal at multiple antennas. Comparison of the phase measurements may indicate possible locations of the transmitter. The flight path may be modified and additional phase measurements may be performed to increase the accuracy of the location detection by reducing the number of possible locations of the transmitter. Modifying the flight path may include causing a rotation of the body, causing a translation of the body, or both. Thus, a location of the transmitter may be detected quickly and with precision.

Figure 2:
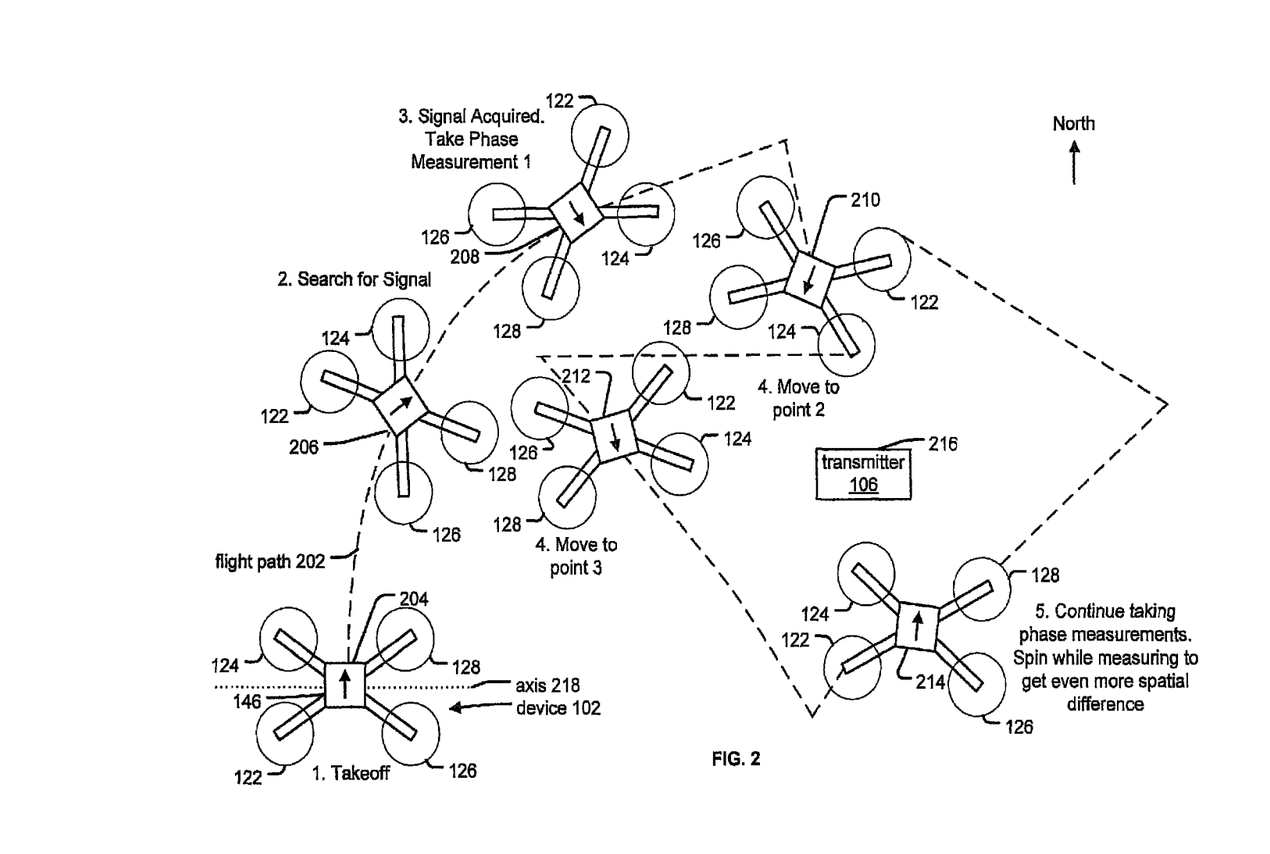
FIG. 2 is a diagram illustrating a flight path that may be implemented by the system of FIG. 1.

Referring to FIG. 2, a diagram illustrating a flight path that may be taken by the device 102 of the system 100 of FIG. 1 is shown and is generally designated 202. FIG. 2 illustrates that an unmanned aerial vehicle (e.g., the device 102 of FIG. 1) may take off at a location 204 of the flight path 202. To illustrate, the controller 142 may activate the rotors 122, 124, 126, and 128 to cause the device 102 to take off.

The flight path 202 may also include locations 206 and 208. The device 102 may fly along the flight path 202 from the location 204 to the location 206 and to the location 208 while searching for a signal from a transmitter (e.g., the transmitter 106 of FIG. 1). The flight path 202 may be preplanned, at least to the location 208, based on an estimated location of the transmitter 106.

At the location 208, the device 102 may acquire a signal (e.g., the first signal) from the transmitter 106 and may perform phase measurements of the first signal, as described with reference to FIG. 1. The fight path 202 may also include a location 210. In a particular embodiment, a predetermined flight path (e.g., a search path that includes the locations 206 and 208) may be modified to include the location 210. For example, the flight path 202 may be modified based on the phase measurements of the first signal, as further described with reference to FIG. 1. The device 102 may fly from the location 208 to the location 210 and may perform additional phase measurements at the location 210 of a second signal received from the transmitter 106.

The flight path 202 may further include other locations (e.g., locations 212 and 214). To illustrate, the predetermined flight path or a flight path determined based on the phase measurements at the locations 208 and 210 may be modified based on the additional phase measurements, as further described with reference to FIG. 1. The device 102 may fly to the other locations and may continue to perform phase measurements, as further described with reference to FIG. 1.

As shown in FIG. 2, the flight path 202 includes a direction of the orientation 146 of the body 104 of the device 102. For example, at the location 204, the orientation 146 may have a first direction (e.g., North) as illustrated in FIG. 2 by an orientation arrow on the device 102 being aligned with the North map key. As another example, at the location 206, the orientation 146 may have a second direction (e.g., North-East). In a particular embodiment, the device 102 may spin or rotate about an axis to change the orientation 146 while taking phase measurements. For example, the device 102 may spin about an axis in any plane. To illustrate, the device 102 may spin about an axis 218. As shown in FIG. 2, the axis 218 is located in a horizontal plane through the central part of the body 104. The axis 218 may be at any angle (0 degrees to 360 degrees) in the horizontal plane. In a particular embodiment, the axis 218 may be located in a vertical plane through the central part of the body 104. For example, the axis 218 may be perpendicular to the page that includes FIG. 2. In a particular embodiment, the axis 218 may be in a diagonal plane through the central part of the body 104. For example, the axis 218 may intersect the page that includes FIG. 2 at a single point and may form an acute angle relative to the page. In a particular embodiment, the axis 218 may be located in a vertical plane, a horizontal plane, or a diagonal plane through a rotor (e.g., the rotor 122, 124, 126, or 128). The flight path 202 may also include turns, altitude changes, station-keeping, straight-level flight, or a combination thereof. For example, the flight path 202 may include a zig-zag pattern. In particular, the flight path 202 may be selected, planned, or adjusted to enable the signal processor 144 to perform phase measurements of signals from the transmitter 106 to quickly detect a location of the transmitter 106.

The flight path 202 ends when the number of possible locations indicated by the phase measurements satisfies the threshold number (e.g., 1) of possible locations, as described with reference to FIG. 1. For example, the signal processor 144 may, based at least in part on the phase measurements at the location 212, narrow the possible locations of the transmitter 106 to the location 216. In response to determining that the number of possible locations of the transmitter 106 satisfies the threshold number of possible locations, the communication system 140 may send a message to the control device 150 indicating the location 216 and indicating that the transmitter location detection has been terminated. After sending the message to the control device 150, the controller 142 may cause the device 102 to traverse another flight path to locate another transmitter or may cause the device 102 to traverse a default flight path. For example, the default flight path may include landing the device 102 at a particular location (e.g., a location of the control device 150 or a storage location of the device 102). To illustrate, the controller 102 may cause the device 102 to detect the location of a transmitter of the control device 150 and to land near the detected location. As another example, the default flight path may include a random flight pattern while waiting for further requests from the control device 150. To illustrate, the control device 150 may send a request to locate another particular transmitter or to land the device 102 at a particular location.

Figure 3:
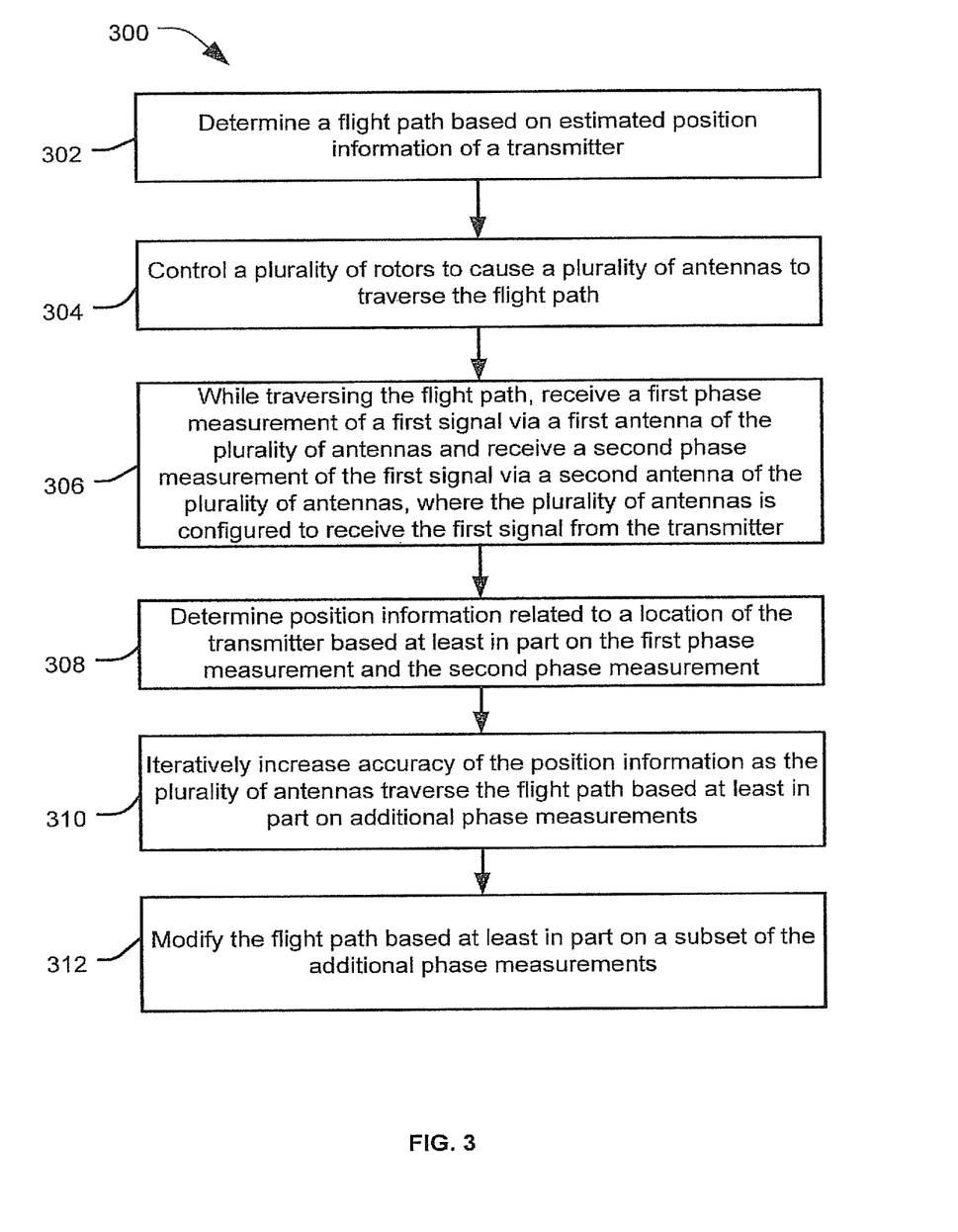
FIG. 3 is a flow chart illustrating a particular embodiment of a method of transmitter location detection.

Referring to FIG. 3, a flow chart of a particular illustrative embodiment of a method of transmitter location detection is shown and is generally designated 300. The method 300 may be executed by the system 100 of FIG. 1.

The method 300 includes determining a flight path based on estimated position information of a transmitter, at 302. For example, the controller 142 may determine a flight path based on estimated position information of the transmitter 106, as further described with reference to FIG. 1.

The method 300 also includes controlling a plurality of rotors to cause a plurality of antennas to traverse the flight path, at 304. For example, the controller 142 may control the rotors 122, 124, 126, and 128 to cause the antennas 132, 134, 136, and 138 to traverse the flight path, as further described with reference to FIG. 1. Traversing the flight path may include concurrent translation of the body 104 in a horizontal plane and rotation of the body 104.

The method 300 further includes, while traversing the flight path, receiving a first phase measurement of a first signal via a first antenna of the plurality of antennas and receiving a second phase measurement of the first signal via a second antenna of the plurality of antennas, at 306. For example, while traversing the flight path, the signal processor 144 may receive a first phase measurement of a first signal via the antenna 132 and may receive a second phase measurement of the first signal via the antenna 134, as further described with reference to FIG. 1.

The method 300 also includes determining position information related to the transmitter based at least in part on the first phase measurement and the second phase measurement, at 308. For example, the signal processor 144 may determine the position information 152 based at least in part on the first phase measurement and the second phase measurement, as further described with reference to FIG. 1.

The method 300 further includes iteratively increasing accuracy of the position information as the plurality of antennas traverse the flight path based at least in part on additional phase measurements, at 310. For example, the signal processor 144 may iteratively increase accuracy of the position information 152 as the antennas 132, 134, 136, and 138 traverse the flight path based at least in part on additional phase measurements, as further described with reference to FIG. 1.

The method 300 also includes modifying the flight path based at least in part on a subset of the additional phase measurements, at 312. For example, the controller 142 may modify the flight path based at least in part on a subset of the additional phase measurements, as further described with reference to FIG. 1.

Thus, the method 300 may be used to detect a location of a transmitter. A signal processor may estimate the location of the transmitter with greater precision or more quickly using phase measurements corresponding to signals received at multiple antennas at various spatial points as compared to phase measurements corresponding to signals received at antennas located at fixed spatial points. A controller may modify the flight path to enable iteratively improving the accuracy of position information associated with the transmitter. The concurrent translation and rotation of the body of the device may enable the device to follow a flight path that results in a more accurate and/or a more efficient estimation of the transmitter location and that may be difficult to follow using a manned aerial vehicle such as an airplane or helicopter.

Figure 4:
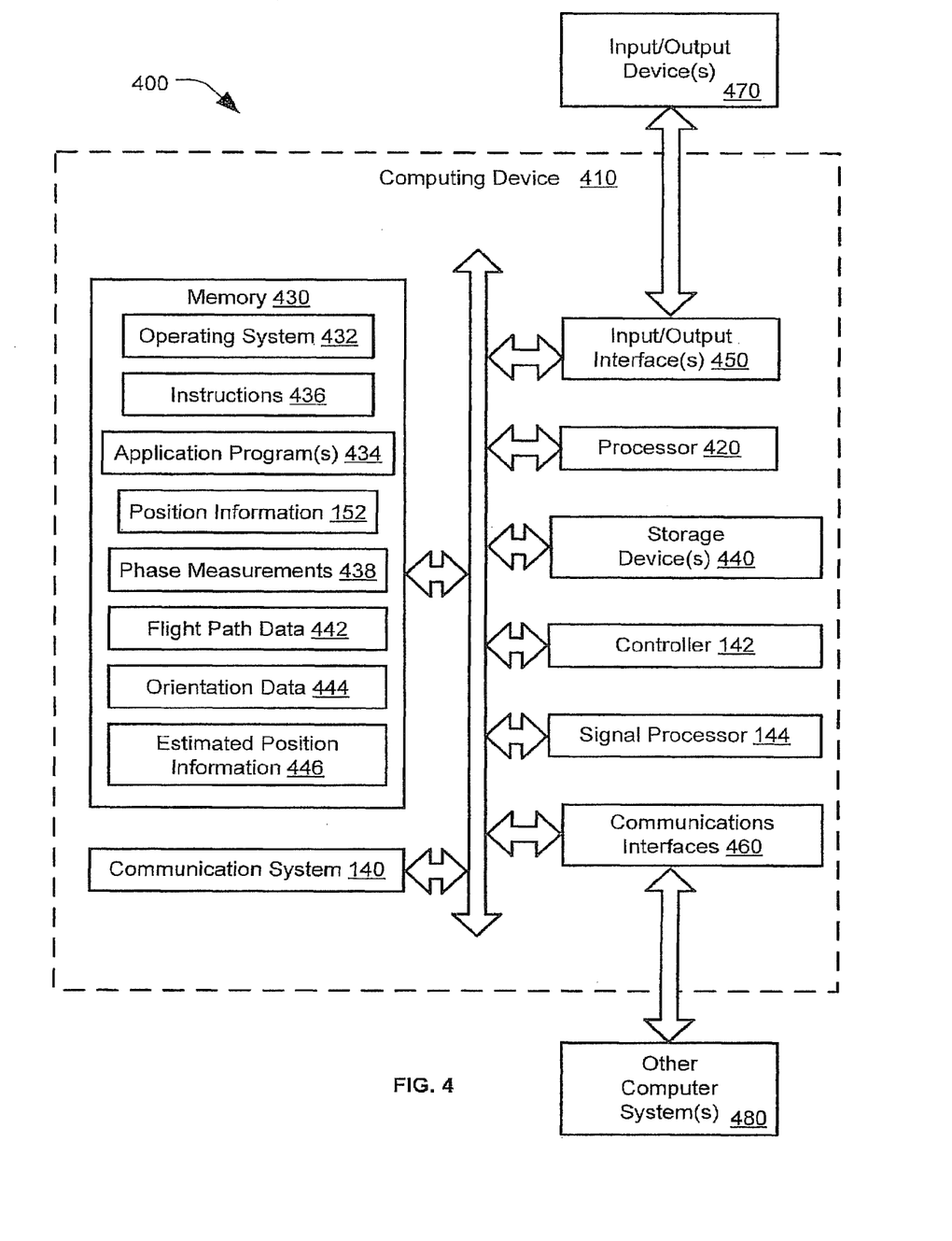
FIG. 4 is a block diagram of a particular illustrative embodiment of a computing environment to detect a transmitter location.

FIG. 4 is a block diagram of a computing environment 400 including a general purpose computing device 410 to support embodiments of computer-implemented methods and computer-executable program instructions (or code) according to the present disclosure. For example, the computing device 410, or portions thereof, may execute instructions to detect a location of a transmitter. In a particular embodiment, the computing device 410 may include, be included with, or correspond to the system 100 of FIG. 1. For example, the computing device 410 may include, be included with, or correspond to the controller 142, the communication system 140, the signal processor 144, the control device 150 of FIG. 1, or a combination thereof.

The computing device 410 may include a processor 420. The processor 420 may communicate with the memory 430, the communication system 140, the controller 142, the signal processor 144 of FIG. 1, one or more storage devices 440, one or more input/output interfaces 450, one or more communications interfaces 460, or a combination thereof. In a particular embodiment, instructions 436 are stored in the memory 430 and are executable by the processor 420 to perform one or more functions described with respect to FIGS. 1-3.

The memory 430 may include volatile memory devices (e.g., random access memory (RAM) devices), nonvolatile memory devices (e.g., read-only memory (ROM) devices, programmable read-only memory, and flash memory), or both. The memory 430 may include an operating system 432, which may include a basic/input output system for booting the computing device 410 as well as a full operating system to enable the computing device 410 to interact with users, other programs, and other devices. The memory 430 may include one or more application programs 434, such as a transmitter location detection application, e.g., an application that is executable to detect a transmitter location. The memory 430 may include the position information 152 of FIG. 1. The memory 430 may store phase measurements 438. For example, the phase measurements 438 may correspond to the first phase measurement, the second phase measurement, the additional phase measurements described with reference to FIG. 1, or a combination thereof.

The memory 430 may include flight path data 442, estimated position information 446, or both. The flight path data 442 may correspond to the flight path described with reference to FIG. 1, the flight path 202 of FIG. 2, or both. The estimated position information 446 may correspond to the estimated position information described with reference to FIG. 1. The memory 430 may include orientation data 444. The orientation data 444 may indicate the orientation 146 of the device 102 of FIG. 1 associated with one or more phase measurements (e.g., at the time of receiving a signal corresponding to each of the phase measurements).

The processor 420 may also communicate with one or more storage devices 440. For example, the one or more storage devices 440 may include nonvolatile storage devices, such as magnetic disks, optical disks, or flash memory devices. The storage devices 440 may include both removable and non-removable memory devices. The storage devices 440 may be configured to store an operating system, images of operating systems, applications, and program data. In a particular embodiment, the memory 430, the storage devices 440, or both, include tangible, non-transitory computer-readable media.

The processor 420 may also communicate with one or more input/output interfaces 450 that enable the computing device 410 to communicate with one or more input/output devices 470 to facilitate user interaction. The input/output interfaces 450 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 470 may include keyboards, pointing devices, displays, speakers, microphones, touch screens, and other devices. The processor 420 may detect interaction events based on user input received via the input/output interfaces 450. Additionally, the processor 420 may send a display to a display device via the input/output interfaces 450. When the computing environment 400 corresponds to the device 102 of FIG. 1, components of the computing environment 400 may have characteristics selected for use in an unmanned aerial vehicle. For example, the computing environment 400, the processor 420, or both, may be relatively small, lightweight, and vibration resistant. The processor 420 may also have limited computational capability. Accordingly, in this embodiment, some of the processing to perform methods described herein may be divided between a processor of the device 102 and a processor of the control device 150.

The processor 420 may communicate with other computer systems 480 via the one or more communications interfaces 460. The one or more communications interfaces 460 may include wired Ethernet interfaces, IEEE 802 wireless interfaces, other wireless communication interfaces, or other network interfaces. The other computer systems 480 may include host computers, servers, workstations, and other computing devices. For example, the device 102 may store position information 152 at a server. The position information 152 may be accessible from the server by a plurality of other devices (e.g., the control device 150). As another example, the other computer systems 480 may include the control device 150 of FIG. 1.

Thus, in particular embodiments, a computer system may be able to detect a transmitter location. For example, the instructions 436 may be executable by the processor 420 to detect a location of a transmitter.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to fewer than all of the features of any of the disclosed embodiments.

What is claimed is:

1. A method comprising:
    controlling, by a processor, a plurality of rotors to cause a plurality of antennas to traverse a flight path, wherein traversing the flight path includes concurrent translation of a body in a horizontal plane and rotation of the body about an axis, wherein the plurality of rotors is coupled to the body;
    while traversing the flight path:
        receiving, at processor, a first phase measurement of a first signal via a first antenna of the plurality of antennas, wherein the plurality of antennas is configured to receive the first signal from a transmitter; and
        receiving, at the processor, a second phase measurement of the first signal via a second antenna of the plurality of antennas;
    determining, by the processor, position information related to a location of the transmitter based at least in part on the first phase measurement and the second phase measurement; and
    iteratively increasing, by the processor, accuracy of the position information as the plurality of antennas traverse the flight path based at least in part on additional phase measurements.

2. The method of claim 1,
    wherein the body comprises a plurality of arms extended from a central portion of the body,
    wherein the first antenna is coupled to a first arm of the plurality of arms, and
    wherein a first rotor of the plurality of rotors is coupled to the first arm.

3. The method of claim 2, wherein the second antenna is coupled to a second arm of the plurality of arms, wherein the first arm extends from the central portion in a first direction, and wherein the second arm extends from the central portion in a second direction opposite to the first direction in the horizontal plane.

4. The method of claim 1, wherein the position information is determined based on a comparison between the first phase measurement and the second phase measurement.

5. The method of claim 1, wherein the additional phase measurements include a third phase measurement of a second signal received via the first antenna and a fourth phase measurement of the second signal received via the second antenna.

6. The method of claim 1, further comprising:
    modifying the flight path based at least in part on a subset of the additional phase measurements.

7. The method of claim 1, wherein the flight path includes a predetermined turn, a predetermined rotation, or both.

8. The method of claim 1, wherein the position information is determined based at least in part on the first phase measurement and a first orientation of the body at a time associated with the first phase measurement.

9. The method of claim 1, further comprising:
    determining the flight path based on estimated position information of the transmitter.

10. A device comprising:
    a body;
    a plurality of rotors coupled to the body;
    a plurality of antennas physically coupled to the body and configured to receive a first signal from a transmitter;
    a controller coupled to the body and configured to control the plurality of rotors to cause the plurality of antennas to traverse a flight path, wherein traversing the flight path includes concurrent translation of the body in a horizontal plane and rotation of the body about an axis; and
    a signal processor coupled to the body and configured to:
        determine a first phase measurement of the first signal received at a first antenna of the plurality of antennas;
        determine a second phase measurement of the first signal received at a second antenna of the plurality of antennas;
        determine position information related to a location of the transmitter based at least in part on the first phase measurement and the second phase measurement; and
        iteratively increasing accuracy of the position information as the plurality of antennas traverse the flight path based at least in part on additional phase measurements.

11. The device of claim 10,
    wherein the body comprises a plurality of arms extended from a central portion of the body;
    wherein a first rotor of the plurality of rotors is coupled to a first arm of the plurality of arms; and
    wherein the first antenna of the plurality of antennas is coupled to the first arm of the plurality of arms.

12. The device of claim 10, wherein the first phase measurement indicates an angle of arrival of the first signal at the first antenna, a time of arrival of the first signal at the first antenna, or both.

13. The device of claim 10, further comprising:
    a communication system configured to transmit the position information to another device and to receive a request to modify the flight path, wherein the controller is further configured to modify the flight path based on the request.

14. The device of claim 10, wherein the position information indicates one or more locations corresponding to possible locations of the transmitter when the first signal is received.

15. The device of claim 10, wherein the first antenna includes an antenna array.

16. The device of claim 10, wherein the flight path corresponds to a zig-zag pattern.

17. The device of claim 10, wherein the signal processor is configured to provide a feedback signal to the controller and wherein the controller is configured to modify the flight path based on the feedback signal.

18. The device of claim 17, wherein modifying the flight path includes causing rotation of the body, translation of the body, or both.

19. A computer-readable storage device storing instructions that, when executed by a processor, cause the processor to perform operations comprising:
controlling a plurality of rotors to cause a plurality of antennas to traverse a flight path, wherein traversing the flight path includes concurrent translation of a body in a horizontal plane and rotation of the body about an axis, wherein the plurality of rotors is coupled to the body;
while traversing the flight path:
receiving a first phase measurement of a first signal via a first antenna of the plurality of antennas, wherein the plurality of antennas is configured to receive the first signal from a transmitter; and
receiving a second phase measurement of the first signal via a second antenna of the plurality of antennas;
determining position information related to a location of the transmitter based at least in part on the first phase measurement and the second phase measurement; and
iteratively increasing accuracy of the position information as the plurality of antennas traverse the flight path based at least in part on additional phase measurements.

20. The computer-readable storage device of claim 19, wherein the operations further comprise modifying the flight path based on the position information, wherein the position information is determined based on the first phase measurement, a first orientation of the body at a first time associated with the first phase measurement, the second phase measurement, and a second orientation of the body at a second time associated with the second phase measurement.

* * * * *